Oct. 3, 1961   W. J. MANCHESTER   3,002,496
PNEUMATIC ACTUATOR
Filed March 15, 1960   2 Sheets-Sheet 1

INVENTOR.
WM. J. MANCHESTER
BY
*Joseph H. Schofield*
ATTORNEY

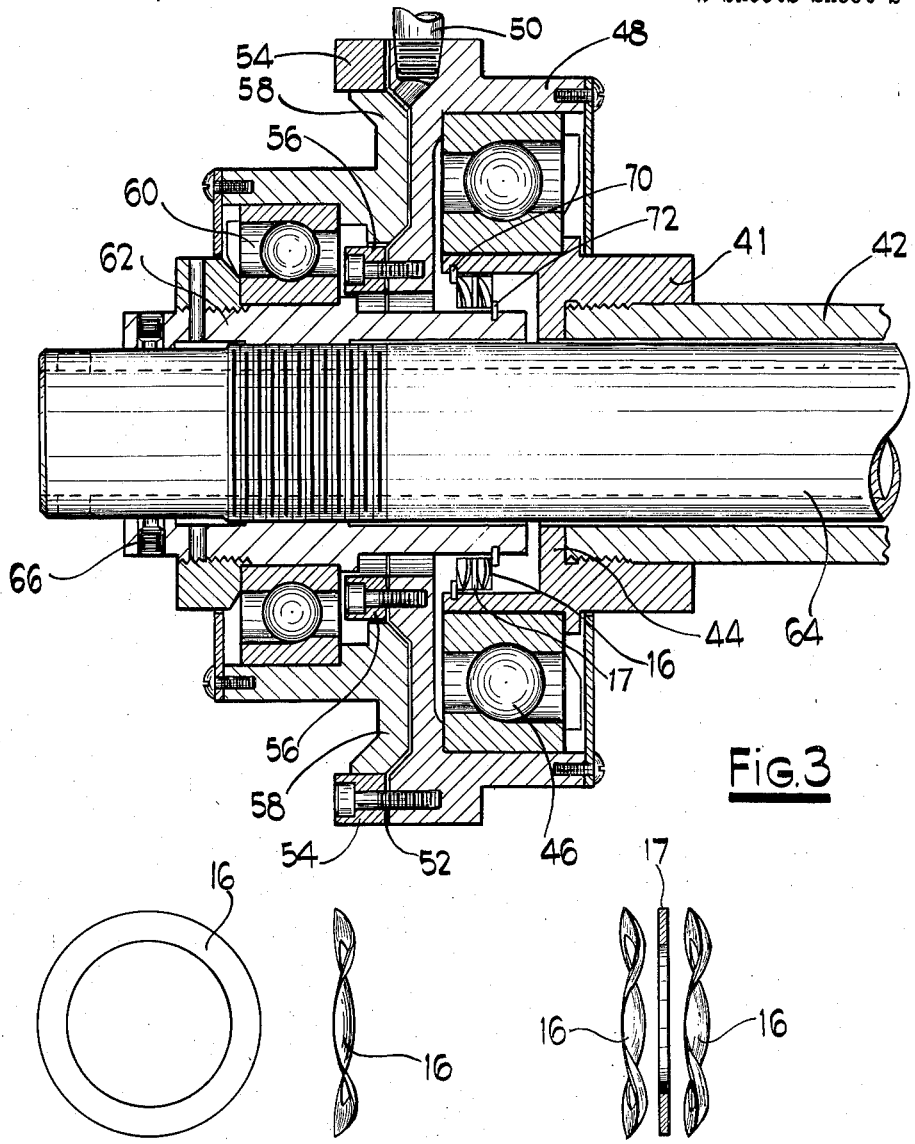

United States Patent Office 3,002,496
Patented Oct. 3, 1961

3,002,496
PNEUMATIC ACTUATOR
William J. Manchester, Cider Mill Road, Rockfall, Conn.
Filed Mar. 15, 1960, Ser. No. 15,165
3 Claims. (Cl. 121—38)

This invention relates to actuators for chucks, collets, clutches and the like for rotatable work spindles of machine tools such as lathes, screw machines, etc., and more particularly to an actuator operated by pneumatic pressure applied against a flexible diaphragm to force a draw-bar or tube in a direction to close the collet or other form of chuck or a clutch.

A primary object of the invention is to provide an improved form of actuator, normally forced as by spring pressure, in a direction to force a bar axially of a headstock spindle and having a pneumatically actuated piston member acting directly on and forcing the draw-bar or tube in the opposite direction.

Another object of the invention is to provide a non-rotating member by which an attachment is made to a source of air under pressure, this member surrounding and being mounted on the rotating member of the actuator by means of spaced anti-friction bearings.

A feature of construction that enables the above objects to be accomplished is that an annular diaphragm has its inner and outer circular edges attached to one of the non-rotating members of the actuator and, with air under pressure admitted to one side of the diaphragm, forces another non-rotating member which acts as a piston member and is connected to a rotating member by a second anti-friction bearing to force the actuating or draw tube in a direction to close a collet or other form of chuck or engage a clutch.

With the above and other objects in view, the invention may include the features of construction and operation set forth in the accompanying specification and illustrated in the accompanying drawings.

In the accompanying drawings annexed hereto and forming a part of this specification, I have shown the invention embodied in an actuator for collet chuck for a lathe, screw machine or the like, but it will be understood that the invention may be otherwise embodied and that the drawings are not to be construed as defining or limiting the scope of the invention, the claims appended to this specification being relied upon for that purpose.

In the drawings:

FIG. 3 is a view similar to FIG. 1, showing a slightly modified form of the invention;

FIG. 4 is an edge view of the spring washer employed to force the operative members of the collet actuator in a direction to open the collet;

FIG. 5 is a side view of the spring washer shown in FIG. 4; and

FIG. 6 is an arrangement of spring washers to permit increased travel of the draw tube, the springs being shown spaced apart for clarity.

In the above mentioned drawings there have been shown but two embodiments of the invention adapted for actuating collet chucks which are now deemed preferable; it will be understood, however, that changes and modifications may be made within the scope of the appended claims without departing from the spirit of the invention.

Figure 1:
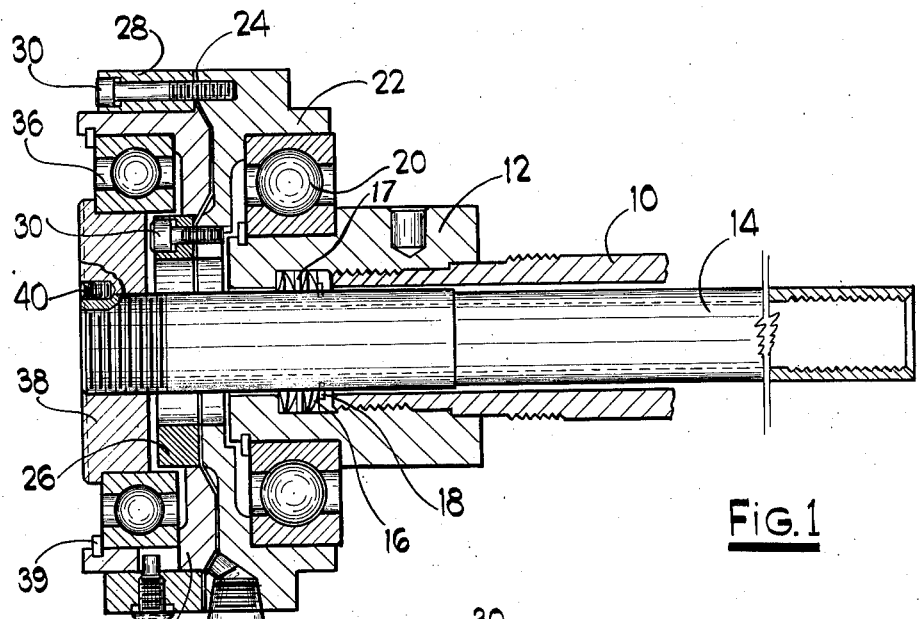
FIG. 1 is a central longitudinal section of one embodiment of the invention.
Figure 2:
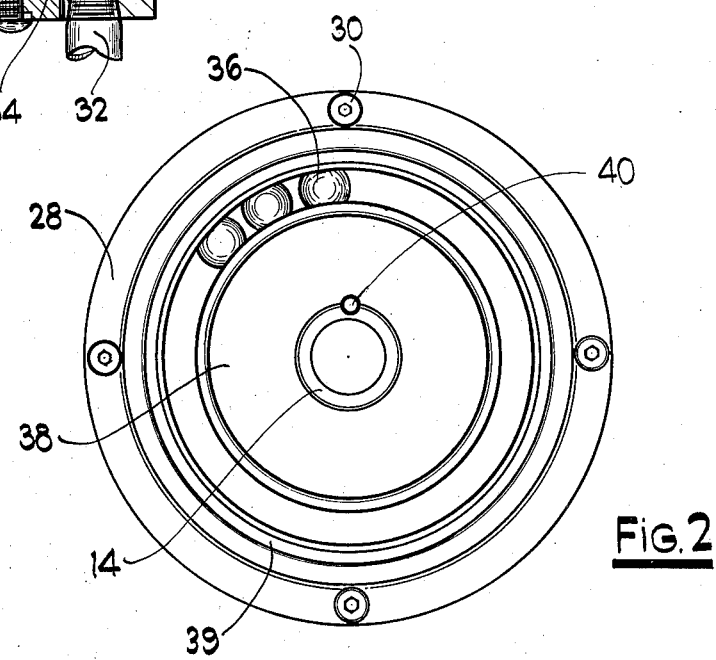
FIG. 2 is an end view of the collet actuator shown in FIG. 1, the view being taken from the left-hand end of FIG. 1.

Referring more in detail to the figures of the drawing and first to FIGS. 1 and 2, it will be seen that the collet actuator is mounted on the threaded end of a rotatably mounted spindle 10. The spindle 10 may be rotatably mounted in a conventional manner within the headstock (not shown) of a lathe or other form of machine tool. At the opposite end of the spindle 10 is a collet or other form of chuck (not shown) within which the work piece is clamped. Through the member 12 threaded to the spindle 10 extends the draw rod or tube 14 by the longitudinal movement of which a clutch, collet, or other form of chuck is opened and closed. As the type and mounting of the chuck or clutch form no part of the present invention, further description thereof is not thought necessary.

Within a recess formed within the member 12 threaded to the spindle 10 is housed one or more wavy spring washers 16 abutting on one side against a shoulder formed at the inner end of the recess in member 12. The opposite face of the spring washers 16 contacts a snap ring 18 set into the draw tube 14 as shown. By means of these spring washers 16 mounted as described, the rod or tube 14 is forced normally to the right. Movement of the tube 14 to the left as seen in FIG. 1 compresses the convolutions of the washers into a substantially plane surface. Several wavy spring washers 16 or other form of spring washers may be used nested together to increase the spring pressure. Also several washers may be used spaced between flat washers 17 to increase the travel of the draw tube 14. This arrangement of spring washers is shown in FIG. 6.

Mounted on an outside cylindrical surface of the member 12 rotating with the spindle 10 is the inner race of an anti-friction bearing 20. The outer race of this bearing 20 is housed within a recess of a member 22 presently to be more fully described. Rotation of the inner race of the bearing 20 with the spindle 10 therefore does not rotate this member 22 carrying the outer race of the bearing 20.

On the left hand face of the outer or non-rotating member 22 is an annular flexible diaphragm 24 secured to the member at its outer and inner peripheries. For this purpose rings 26 and 28 are provided bearing against the outer side of the diaphragm. Both rings 26 and 28 are secured to the member 22 by screws 30 as shown.

At the lower portion of the non-rotating mmeber 22 is a connection 32 to a source of air under pressure which admits air to the space between the non-rotating member 22 and the diaphragm 24.

Bearing against the central portion of the outer face of the diaphragm 24 is an annular member 34 which acts as a piston slidably mounted for movement axially of the spindle 10 and draw tube 14. As shown the outer surface of this piston member 34 slidably bears against the inner surface of the outer ring 28 for securing the periphery of the diaphragm. This ring 28, it will be seen in FIG. 1, forms an internal cylindrical surface for guiding the piston member 34. With air under pressure admitted to the space to the right of the diaphragm 24 as seen in FIG. 1, the piston member 34 is forced to the left in a direction to close the chuck or engage the clutch.

Housed within this piston member 34 is the outer race of an anti-friction bearing 36 the inner race of which is mounted in a member 38 threaded as shown over the end of the draw tube 14. The inner race may be retained in place on member 38 by a flange formed on the outer portion of member 38. A locking screw 40 threaded axially into the threaded portions of the draw tube 14 and member 38 serves to retain the adjustment of the threaded member 38 on the draw tube 14 and thus maintains the adjustment for which the actuator is set.

To retain the outer race of bearing 36 a snap ring 39 may be provided within the outer portion of the cylindrical surface forming the seat for the outer race of bearing 36.

From the above described construction it will be seen that with air pressure admitted to the space to the right of the diaphragm 24 as seen in FIG. 1, the member 38 threaded on the end of the draw tube 14 will be forced to the left and will therefore move the draw tube 14 to the left. This is the direction which will operate to close the chuck or collet (not shown) mounted on the spindle 10. Upon release of pressure acting against the diaphragm 24, the draw tube 14 will be forced to the right by the spring washers 16 housed within member 12 referred to above.

Preferably the spring washers 16 housed within the recess of the rotating member 12 for the spindle 10 which acts on the draw tube 14 may be of the so-called wavy spring washer type in which an annulus of flat metal such as steel is formed as shown in FIGS. 4 and 6. Flattening of the bent out portions or convolutions of these washers 16 permits limited movement only of the draw tube 14. When pressure is released the washers 16 spring back to their initial wavy form to move the tube 14 axially in a direction to open the collet or chuck or disengage the clutch.

Referring to the embodiment of the invention shown in FIG. 3 it will be seen that the member 41 threaded over the end of the spindle 42 on which the actuator is mounted has an inwardly extending flange 44 bearing directly against the end of the spindle 42. This member 41 carries the inner race of an anti-friction bearing 46 the outer race of which is housed within an outer non-rotating member 48 having a connection 50 to air under pressure. This outer member 48 also has an annular diaphragm 52 secured to the left hand face of the outer member 48 by outer and inner rings 54—56 engaging its outer and inner periphery of the diaphragm 52 respectively. Admission of air under pressure on the right hand side of the diaphragm 52 through connection 50 forces a piston member 58 to the left. This piston member 58 carries the outer race of an anti-friction member 60 the inner race of which is carried by a sleeve member 62 adjustably threaded on the draw tube 64 within spindle 42. This sleeve member 62 is locked in adjusted position on the draw tube 64 by one or more radially disposed screws 66 in the sleeve member 62 bearing against the surface of the draw tube 64 at their inner ends.

To retract the draw tube 64 in a direction to open the chuck or release the clutch, spring washers 16 exactly similar to that shown in FIGS. 4 and 5 may be used as in the embodiment shown in FIG. 1. The spring washers 16 on one side bear against a snap ring 70 within a recessed portion of the member 41 threaded over the end of the spindle 42. The opposite side of the washers 16 bears against a snap ring 72 within a position at the inner end of the member 62 threaded to the draw tube 64.

I claim as my invention:

1. A pneumatic actuator for chucks and the like comprising, a rotatably mounted spindle, a draw tube within said spindle for operating a chuck thereon, a member mounted on and rotating with said spindle, a non-rotating member, an anti-friction bearing disposed between said members, an annular flexible diaphragm attached at its inner and outer edges to said non-rotating member, means to admit air under pressure to the space between said diaphragm and non-rotating member, a piston member bearing against said diaphragm and movable axially of said spindle when air under pressure is admitted against one side of said diaphargm, and a rotating member housed within said piston member axially adjustably connected to said draw tube, an anti-friction bearing between said piston member and adjustable member, whereby said draw tube will be actuated in one direction when air under pressure is admitted on one side of said diaphragm, and spring means normally forcing said draw tube in the opposite direction.

2. A pneumatic actuator for chucks and the like comprising, a rotatably mounted spindle, a draw tube within said spindle for operating a chuck thereon, a member mounted on and rotating with said spindle, a non-rotating member surrounding said rotating member, an anti-friction bearing disposed between said members, a diaphragm attached to said non-rotating member, means to admit air under pressure to the space between said diaphragm and non-rotating member, a piston member engaging against said diaphragm and movable axially of said spindle when air under pressure is admitted to the space on one side of said diaphragm, and a rotating member housed within said piston member axially adjustably connected to its said draw tube, an anti-friction bearing between said piston member and adjustable member, whereby said draw tube will be actuated in one direction when air under pressure is admitted on one side of said diaphragm, and spring washers housed between said member rotating with said spindle and said draw tube normally forcing said draw tube in the opposite direction.

3. A pneumatic actuator for chucks and the like comprising, a rotatably mounted spindle, a draw tube within said spindle for operating a chuck thereon, a member mounted on and rotating with said spindle, a non-rotating member, an anti-friction bearing disposed between said members, an annular flexible diaphragm attached at its inner and outer peripheries to said non-rotating member, means to admit air under pressure to the space between said diaphragm and non-rotating member, a piston member movable axially within said non-rotating member when air under pressure is admitted to the space on one side of said diaphragm, and a rotating member housed within said piston member axially adjustably connected to its said draw tube, an anti-friction bearing between said piston member and adjustable member, whereby said draw tube is actuated in one direction when air under pressure is admitted on one side of said diaphragm, and annular wavy spring washers housed between surfaces of said first mentioned rotating member and said draw tube, said spring members normally forcing said draw tube in the opposite direction.

References Cited in the file of this patent
UNITED STATES PATENTS
2,793,040   Wilson ---------------- May 21, 1957